United States Patent
Syed

(10) Patent No.: US 10,127,542 B2
(45) Date of Patent: Nov. 13, 2018

(54) PAYMENT CODE GENERATION USING A WIRELESS BEACON AT A MERCHANT LOCATION

(71) Applicant: PAYPAL, INC., San Jose, CA (US)

(72) Inventor: Mobeen Syed, San Jose, CA (US)

(73) Assignee: PAYPAL, INC., San Jose, CA (US)

(\*) Notice: Subject to any disclaimer, the term of this patent is extended or adjusted under 35 U.S.C. 154(b) by 629 days.

(21) Appl. No.: 14/697,926

(22) Filed: Apr. 28, 2015

(65) Prior Publication Data

US 2015/0310417 A1 Oct. 29, 2015

Related U.S. Application Data

(60) Provisional application No. 61/985,942, filed on Apr. 29, 2014.

(51) Int. Cl.
*G06Q 20/32* (2012.01)
*G06Q 20/38* (2012.01)

(52) U.S. Cl.
CPC ......... *G06Q 20/322* (2013.01); *G06Q 20/327* (2013.01); *G06Q 20/382* (2013.01)

(58) Field of Classification Search
CPC .................................................... G06Q 30/32
USPC ..................................................... 705/35–45
See application file for complete search history.

(56) References Cited

U.S. PATENT DOCUMENTS

| | | | |
|---|---|---|---|
| 7,209,903 B1* | 4/2007 | Mamdani | G06K 7/1095 235/375 |
| 2007/0175978 A1* | 8/2007 | Stambaugh | G06Q 20/32 235/379 |
| 2013/0013502 A1* | 1/2013 | Purvis | G06O 20/3223 705/42 |
| 2013/0110658 A1* | 5/2013 | Lyman | G06Q 20/20 705/18 |
| 2015/0248702 A1* | 9/2015 | Chatterton | G06Q 30/0261 705/14.58 |

\* cited by examiner

*Primary Examiner* — Robert R Niquette
(74) *Attorney, Agent, or Firm* — Haynes and Boone, LLP

(57) ABSTRACT

There are provided systems and method for payment code generation using a wireless beacon at a merchant location. A check-in at a merchant location may be completed using a wireless beacon at the merchant location with a communication device. After check-in a user using the communication device may request a payment code be generated from a payment provider that enables the user to have the payment code scanned by a merchant scanner at a point of sale device and complete payment for items with the merchant. The request to generate the payment code may be transmitted from the communication device to the wireless beacon, where the wireless beacon transmits the code over a network connection with the payment provider. Once the code is generated, the wireless beacon may receive the code and transmit the code back to the communication device.

20 Claims, 4 Drawing Sheets

PAYMENT CODE GENERATION USING A WIRELESS BEACON AT A MERCHANT LOCATION

CROSS REFERENCE TO RELATED APPLICATION

This application claims priority to U.S. Provisional Patent Application Ser. No. 61/985,942, filed Apr. 29, 2014, which is hereby incorporated by reference in the aforementioned application's entirety.

TECHNICAL FIELD

The present application generally relates to device interactions over a network facilitated by short range wireless communications with a beacon local to a device and more specifically to payment code generation using a wireless beacon at a merchant location.

BACKGROUND

Consumers may visit merchants, such as grocery stores, shopping mall locations, etc., where the consumer wishes to purchase products. Consumers are required to bring a form of payment with them to the merchant, potentially exposing the consumer to fraud or theft. Moreover, if the consumer wishes to purchase items and/or services, the consumer is either required to know the limits of their payment instrument, for example, a payment card or financial account, or the consumer must bring an adequate amount of cash. If the consumer wishes to purchase additional items over the amount the consumer has initially brought with them to the merchant's location, the consumer may be required to either return to the merchant or open a line of credit with the merchant, which both may be suboptimal for the consumer.

Figure 1:
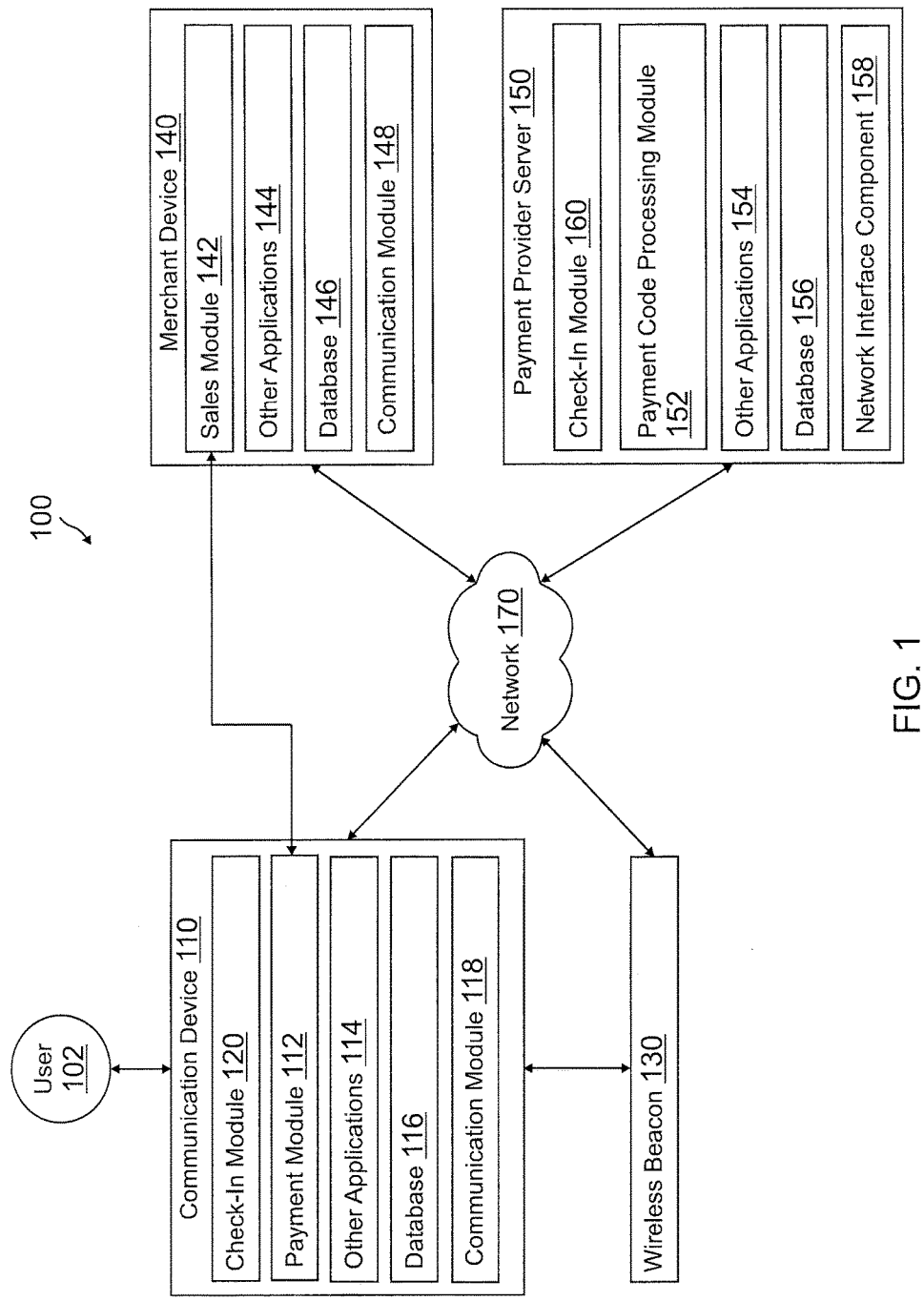
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various merchants at retail locations may utilize short range wireless communication with a communication device, such as Bluetooth Low Energy beacon communications. These beacons may be set up at a merchant store and communicate with the communication device to alert a user (e.g., a consumer) of check-in services, discounts at the merchant, or available merchandise from the merchant. The user may be notified as soon as they are in proximity to the beacon through their communication device. The beacons may also be utilized to communicate information from the communication device to the merchant and/or merchant server.

The check-in services may be completed over a network connection between a communication device and a device/server for the merchant (including a payment provider offering payment services to the merchant). However, in other embodiments, check-in may be completed using short range wireless beacons connected to the device/server completing the check in, where the short range wireless beacon is in communication with the communication device using short range wireless communication, such as Bluetooth Low Energy (BLE). Thus, the communication device may connect to the beacon and complete a check-in by transmitting check-in information to the beacon. The check-in information may then be transmitted to the device/server completing the check-in (e.g., a payment provider's server) and a check-in of the user at the merchant may be completed.

Once a check-in for the user is completed, a payment provider may receive a request to generate a payment code from the wireless beacon. A payment provider may offer payment services to the user. For example, the payment provider may accept payment cards, financial accounts, etc., with a payment request to the merchant and provide processing services for the payment request. In other embodiments, the user may establish a payment account with the payment provider, which may be used to complete transactions for payment requests to the merchant. Thus, the payment provider may offer transaction processing services to the user.

The payment code may be received from the wireless beacon after a request for the payment code is initiated by the communication device. The payment code may correspond to a bar code, QR code, numeric or alphanumeric string, image containing readable data, etc. The payment code may further include an amount authorized by the payment provider to be paid to the merchant. For example, the payment request may include a predetermined limit the user may spend at the merchant, such as $100 total, or may include an exact amount to pay the merchant based on a purchase request generated by the merchant for items selected by the user. The request for the payment code may be initiated when the user first enters a location for the merchant and connects to the wireless device. Thus, the payment code may be generated using information available in the check-in information and/or request transmitted from the wireless device (e.g., an identifier for a payment account, payment/financial account information, payment card information, etc.). In certain embodiments, the payment code is generated using a payment account held by the user with the payment provider. The check-in information and/or request may include information enabling the payment provider to identify the user's payment account, such as a user ID, phone number, email address, device identifier, user identifier, etc. Thus, the amount of money in or accessible to the payment account, or a predetermined limit of the user account set by the user to be authorized in a payment code, may affect generation of the payment code and the amount of money available in the payment code.

In other embodiments, the payment code may be generated based on a preauthorized credit limit for the user. The credit limit may be determined based on information known of the user, such as information received in the check-in information and/or available in a payment account of the user with the payment provider. The credit limit may be determined as the user travels through the merchant location and looks up items or scans items to purchase. The credit limit may also be determined based on information received from the merchant, such as a checkout scan of an item the user wishes to purchase. For example, the user may wish to purchase a $1000 television at a merchant location but only have $800 available in a payment account or using a payment card. Thus, the payment provider may offer $200-$1000 of credit to the user based on information about the user (e.g., a credit score or other available information) and/or merchant. Such information may be relayed to the payment provider from the wireless beacon. Payment codes generated prior to a user checking out may be generated automatically as the communication device connects to the wireless beacon or as the communication device or a merchant sale device is used to scan/lookup items. The payment code may also be actively requested by the user when arriving at the merchant's location or shopping throughout the location.

The payment code may also be requested when the user is ready to check-out with the merchant. Thus, the user may select various items to purchase and bring them to a point of sale or check-out machine. Once all of the items are scanned and a total is known for the user, the user may initiate a request to generate a payment code. For example, the total may be pushed to the communication device of the user, and the user may select an option in an application interface that requests a payment code. The request may be transmitted to the wireless beacon in connection with the communication device, and the wireless beacon may transmit the request to the payment provider's server. As previously discussed, the request may include information identifying a payment account of the user or may include other payment/financial information (e.g., a payment card, bank account, etc.). Since the request also includes a total amount to pay the payment provider, the payment code may be generated using that amount. The payment code may also include a purchase description.

Once the payment code is received on the communication device from the wireless beacon, the user may display the payment code on an interface of the communication device. The user may then input the payment code to the point of sale or check-out machine at the merchant's location. In certain embodiments, the user may allow for the payment code to be scanned or otherwise captured using an IR, visual, or other input scanner. In certain embodiments, the payment code may include identification for the merchant (e.g., a merchant account with a payment provider, a merchant identifier, etc.). The identification may be transmitted to the payment provider from the wireless beacon. However, in other embodiments, the payment code need not include the identification for the merchant and enable any merchant scanner to input the payment code. Once the payment code has been scanned, a transaction history may be generated and transmitted to the user and/or merchant documenting use of the payment code. In certain embodiments, if the payment code is not scanned for a period of time, or if the communication device disconnects from the wireless beacon at the merchant location, the payment code may become invalid to prevent fraud.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a wireless beacon 130, a merchant device 140, and a payment provider server 150 in communication over a network 170. User 102, such as a consumer, may utilize communication device 110 to check-in with wireless beacon 130 and associate with a merchant corresponding to merchant device 140. User 102 may further request a payment code be generated by payment provider server 150 using communication device 110. Communication device 110 may communicate the request to wireless beacon 130, which transmits the request to payment provider server 150. After the payment code is generated, payment provider server 150 may provide the payment code to wireless beacon 130, which may relay the payment code back to communication device 110. When user 102 is ready to pay for items, user 102 may display the payment code on communication device 110 to merchant device 140 to complete a transaction for the items.

Communication device 110, wireless beacon 130, merchant device 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented using any appropriate hardware and software configured for wired and/or wireless communication with wireless beacon 130, merchant device 140, and payment provider server 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may be utilized.

Communication device 110 of FIG. 1 contains a check-in module 120, a payment module 112, other applications 114, a database 116, and a communication module 118. Check-in module 120, payment module 112, and other applications 114 may correspond to executable processes, procedures, and/or applications with associated hardware. In other embodiments, communication device 110 may include additional or different software as required.

Check-in module 120 may correspond to one or more processes to execute modules and associated specialized hardware of communication device 110 that may be used by user 102 of communication device 110 to establish a check-in with payment provider server 150. Check-in module 120 may correspond to a specific application utilized by communication device 110 with payment provider server 150. The check-in may correspond to a processes to log in to a user account of user 102 with payment provider server 150 or otherwise provide and verify identity of user 102, including transmission of an identifier for a payment account with payment provider server 150. In this regard, check-in module 120 may correspond to specialized hardware and/or software of communication device 110 to complete the check-in over network 170 with payment provider server 150. In such embodiments, check-in module 120 may correspond more generally to a browser application configured to communicate with the server. For example, check-in module 120 may establish an initial check-in with payment provider server 150 to purchase items from merchant device 140. Thus, the check-in may be completed prior to communication device 110 connecting to wireless beacon 130.

In other embodiments, check-in module 120 may also correspond to an application available over the Internet from a server, including a server corresponding to payment provider server 150. Check-in module 120 may be set up to receive short range wireless communications with wireless beacon 130 to complete a check-in process. For example, wireless beacon 130 may communicate with communication device 110 and complete the check-in process while user 102 is at or near wireless beacon 130. Wireless beacon 130 may be configured to transmit an identifier for reception by communication device 110.

Check-in module 120 may execute in the background of an operating system of communication device 110 and be configured to establish connections, using communication module 118 of communication device 110, with wireless beacon 130. The connection may be established with or without user input from user 102. For example, wireless beacon 130 may broadcast a token, including a universally unique identifier (UUID), for reception by check-in module 120, as will be explained in more detail herein. Check-in module 120 may utilize communication module 118 of communication device 110 to receive the token from wireless beacon 130. If check-in module 120 acknowledges the UUID as identifying wireless beacon 130 and/or payment provider server 150, check-in module 120 may transmit an identifier corresponding to user 102 and/or communication device 110 back to wireless beacon 130. Check-in module 120 may utilize communication module 118 of communication device 110 to communicate with wireless beacon 130 (e.g., over near field communication, Bluetooth, Bluetooth Low Energy, radio, infrared, or other connection). The identifier from communication device 110 may include, be transmitted with, concatenated with, or otherwise bundled with the identifier received from wireless beacon 130. Identifiers may be transmitted as an encrypted token using public/private key(s) of communication device 110, wireless beacon 130, and/or payment provider server 150. Additionally, tokens may include a received identifier from the intended recipient of the token in addition to the transmitted identifier in order to identify the token's intended recipient.

Once check-in module 120 has completed a check-in for user 102, communication device 110 may be connected with payment provider server 150 if user 102 has not previously been checked-in. The check-in process may then associate user 102 with wireless beacon 130 used to check-in user 102. Thus, user 102 may be associated with a merchant location corresponding to merchant device 140. Check-in module 120 may also pass information to and from payment provider server 150. The additional information may correspond to generation of a payment code. For example, user 102 may request a payment code be generated using payment module 112. Thus, information available to check-in module 120, including user and/or merchant identifiers, may be communicated between communication device 110 and payment provider server 150 using check-in module 120.

Payment module 112 may correspond to one or more processes to execute modules and associated specialized hardware of communication device 110 that may be used, for example, to provide a convenient interface to permit user 102 to select payment options and provide payment for items and/or services. In this regard, payment module 112 may correspond to specialized hardware and/or software of communication device 110 that may be implemented as an application having a user interface enabling the user to enter payment options for storage by communication device 110, provide payment options on checkout/payment of an item, and complete a transaction for the item. In some embodiments, payment module 112 may correspond more generally to a web browser configured to view information available over the Internet or access a website corresponding to a payment application. Payment module 112 may utilize user financial information, such as a credit card, bank account, or other financial account. Additionally, payment module 112 may provide payment for items using a user account with payment provider, such as payment provider server 150.

Once user 102 has checked-in with payment provider server 150, communication device 110 may request a payment token to be generated for use in providing payment to merchant device 140. The request may be automatically made when communication device 110 checks-in to the merchant location for merchant device 140 using wireless beacon 130. In other embodiments, user 102 may request the payment code be generated using an interface for payment module 112. The request may be a request to authorize a general amount to spend with merchant device 140, or may include a payment request for a specific amount corresponding to items selected by user 102 to purchase. The check-in information and/or request may include payment information enabling generation of the payment code, such as an account identifier, payment card information, etc. The request may therefore correspond to an encrypted payment token. The request may be transmitted to wireless beacon 130 for transmission to payment provider server 150. Payment module 112 of communication device 110 may utilize short range wireless communication of communication device 110 with wireless beacon 130, such as near field communication, Bluetooth, Bluetooth Low Energy, radio, infrared, or other connection. Payment module 112 may encrypt the request/payment token prior to transmission to wireless beacon 130 using an encryption format corresponding to payment provider server 150. Encryption of the payment token may be done to prevent unauthorized reception and use of the payment token by other devices in proximity to and/or contact with wireless beacon 130.

Payment module 112 may further receive the payment code from wireless beacon 130 after payment provider server 150 generates the payment code and transmits the payment code to wireless beacon 130. As previously discussed, the payment code may correspond to a bar code, QR code, numeric/alphanumeric string, image with data, etc. The payment code may be displayable on an interface for payment module 112. Thus, user 102 may input the payment code to merchant device 140 or may have the payment code scanned by a scanned of merchant device 140. Thus, the payment code may be utilized to provide payment for items with merchant device 140.

In various embodiments, check-in module 120 and/or payment module 112 may be incorporated the same module so as to provide their respective features in one interface, process, or multiple processes.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 150. Other applications 114 may contain software programs, executable by a processor, including a graphical user interface (GUI) configured to provide an interface to the user.

Communication device 110 may further include database 116 which may include, for example, identifiers such as operating system registry entries, cookies associated with check-in module 120, payment module 112, and/or other applications 114, identifiers associated with hardware of communication device 110, or other appropriate identifiers, such as identifiers used for payment/user/device authentication or identification. Database 116 may include communication device tokens and/or encryption keys, including a public key of merchant device 140 and/or wireless beacon 130. Database 116 may include identifying information for tokens enabling check-in module 120 to identify merchant device 140 and/or wireless beacon 130 when receiving a corresponding token. In one embodiment, identifiers in database 116 may be used by a payment/credit provider, such as payment provider server 150, to associate communication device 110 with a particular account maintained by the payment/credit provider. Database 116 may further include payment card information, including credit, debit, and/or gift card information. In various embodiments, database 116 may include beacon information and/or merchant information for wireless beacon 130 and/or merchant device 140, respectively. Database 116 may also be used to store payment codes received from wireless beacon 130.

Communication device 110 includes at least one communication module 118 adapted to communicate with merchant device 140, wireless beacon 130, payment provider server 150, and/or payment card issuer server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. In various embodiments, communication module 118 may communicate directly with wireless beacon 130 and/or merchant device 140 using short range wireless communications, such as radio frequency, infrared, Bluetooth, and near field communications.

Wireless beacon 130 may be located at a physical retail location including a merchant and/or service location for merchant device 140. For example, the physical location may correspond to merchants/services at shopping mall, strip malls, airports, train stations, event venues, hotel venues, casino venues, or other location where a merchant/service may be offered. Wireless beacon 130 may be maintained, for example, by payment provider server 150. Wireless beacon 130 may be implemented using any appropriate hardware and software configured for wireless communication with communication device 110. For example, in one embodiment, wireless beacon 130 may be implemented as a dongle device including a hardware processor and a communication module, for example, in communication with payment provider server 150 and connected to merchant device 140. Wireless beacon 130 may also be implemented as a device incorporated within a personal computer (PC), a smart phone, personal digital assistant (PDA), laptop computer, and/or other types of computing devices capable of transmitting and/or receiving data, such as an IPAD® from APPLE®. Wireless beacon 130 may also act as a stand-alone device including a processor, communication module, and/or network interface component configured to communicate with communication device 110 and/or payment provider server 150. Although a single beacon is described, a plurality of wireless beacons may be utilized and be location specific within the merchant location.

Wireless beacon 130 of FIG. 1 contains executable processes, procedures, and/or applications with associated hardware, configured to interact with communication device 110, communication device 140, and/or payment provider server 150. Thus, regardless of the implementation of wireless beacon 130, as discussed above, wireless beacon 130 utilizes a check-in application and a communication module. In other embodiments, wireless beacon 130 may include additional or different software and devices as required.

The check-in application of wireless beacon 130 may correspond to one or more processes to execute modules and associated specialized hardware of wireless beacon 130 for transmitting requests to establish a connection between a device (e.g., communication device 110) and wireless beacon 130. Thus, wireless beacon 130 may utilize short range wireless communications of wireless beacon 130 to transmit requests to establish a connection, including an identifier such as a Universally Unique Identifier (UUID), as previously discussed. If communication device 110 receives a request to establish the connection with wireless beacon 130 and responds with a communication device identifier (potentially including the UUID and other information to effectuate a check-in of communication device 110), the check-in application may cause wireless beacon 130 to ramp up in power and create a connection between communication device 110 and wireless beacon 130.

Wireless beacon 130 may transmit the request to establish the connection with wireless beacon 130 as a short range communication (e.g. a BLE protocol communication) including a "wake up" process for check-in module 120 of communication device 110 and/or a token for wireless beacon 130. In other embodiments, the request and/or connection may utilize near field communication, radio communication, infrared communication, or Bluetooth communication. The request may be specific to communication device 110 by including information that is specific to mobile merchant 102, such as a name, identifier, or communication device identifier. The information specific to user 102 may be determined from a user account of user 102 or other information previously provided to payment provider server 150. Thus, in certain embodiments, only communication device 110 will pick up and authenticate the request.

After the check-in application receives a communication device identifier from communication device 110, the check-in application may determine user 102 is at in proximity to wireless beacon 130. Wireless beacon 130 may pass the communication device identifier to payment provider server 150 to complete the check-in process. Wireless beacon 130 may utilize a communication module to pass the identifier to payment provider server 150, which may then pass the identifier to payment provider server 150. However, in other embodiments, wireless beacon 130 may utilize a network connection of wireless beacon 130 to pass the identifier to payment provider server 150 directly. Additionally, check-in application 132 may cause wireless beacon 130 to keep a communication channel open between communication device 110 and payment provider server 150 for passing additional information, including a request to generate a payment code to payment provider server 150 and relaying the payment code back to communication device 110.

In various embodiments, wireless beacon 130 includes at least one communication module adapted to communicate with communication device 110, merchant device 140, and/or payment provider server 150. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module may communicate with communication device 110 and/or merchant device 140 using short range communications, such as radio frequency, infrared, Bluetooth, and near field communications.

The merchant location corresponding to wireless beacon 130 further includes a merchant device 140, which may correspond to a point of sale (POS) and/or check-out machine/device. Merchant device 140 may be maintained, for example, by a merchant or seller offering various items, products, and/or services through a merchant location. Generally, merchant device 140 may be maintained by anyone or any entity that receives money, which includes charities as well as retailers and restaurants. In other embodiments, merchant device 140 may be maintained by an entity offering items and/or services to user 102, such as grocery stores, retail storefronts, service locations, etc. In this regard, merchant device 140 may include a device having processing applications, which may be configured to interact with communication device 110 and/or payment provider server 150 to facilitate the sale of items and/or process payment codes for the items.

Merchant device 140 may be implemented using any appropriate hardware and software configured for wired and/or wireless communication with communication device 110 and/or payment provider server 150. For example, in one embodiment, merchant device 140 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may be utilized.

Merchant device 140 of FIG. 1 contains a sales module 142, other applications 144, a database 146, and a communication module 148. Sales module 142 and other applications 144 may correspond to processes, procedures, and/or applications executable by a hardware processor, for example, a software program. In other embodiments, merchant device 140 may include additional or different software as required.

Merchant device 140 may correspond to a device enabling merchant/service 130 to complete financial transactions, create and/or transmit advertisements and updates for display by communication device 110, and/or utilize wireless beacon 130 to determine is user 102 is in proximity to merchant device 140 and transmit payment requests/item information to communication device 110. Merchant device 140 may further include check-in applications configured to interact with check-in module 120 of communication device 110 to complete a check-in of user 102 with merchant device 140. Check-in may be done as soon as user 102 checks-in with a server for merchant device 140 or when user 102 is in proximity to merchant device 140 and connects to wireless beacon 130.

Sales module 142 may correspond to one or more processes to execute modules and associated specialized hardware of merchant device 140 that provide checkout and payment processes, which may be configured to complete transactions for items. In this regard, sales module 142 may correspond to specialized hardware and/or software of merchant device 140 to provide a convenient interface to permit a merchant to enter, view, and/or edit items and/or services for purchase by user 102. For example, sales module 142 may be implemented as an application having a user interface enabling the merchant to enter item information and request payment for a payment amount on checkout/payment of one or more items/services. In certain embodiments, sales module 142 may correspond more generally to a web browser configured to view information available over the Internet or access a website corresponding to the merchant and/or payment provider server 150.

Once a payment amount is determined for a transaction for items to be purchased by user 102, sales module 142 may push a payment request for the payment amount to communication device 110 and/or wireless beacon 130. The payment request may be included in a request to generate a payment code sent to payment provider server 150. Once a payment code has been generated by payment provider server 150 and communicated to communication device 110, sales module 142 may also receive the payment code for use in completing a payment request for items user 102 wishes to purchase. As previously discussed, merchant device 140 may scan the payment code or other have the payment code input to sales module 142. Sales module 142 may verify the authenticity of the payment code and the amount of funds covered by the payment code, potentially through communications with payment provider server 150. If the payment code covers the amount of the payment request, sales module 142 may authorize the transaction.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 170, or other types of applications. Other applications 144 may also include email, texting, voice and IM applications that allow a user to send and receive emails, calls, texts, and other notifications through network 170. In various embodiments, other applications 144 may include financial applications, such as banking, online payments, money transfer, or other applications associated with payment provider server 150. Other applications 144 may contain software programs, executable by a processor, including a graphical user interface (GUI) configured to provide an interface to the user.

Merchant device 140 may further include database 146 which may include, for example, identifiers such as operating system registry entries, cookies associated with sales module 142 and/or other applications 144, identifiers associated with hardware of merchant device 140, or other appropriate identifiers, such as identifiers used for payment/user/device authentication or identification. Identifiers in database 146 may be used by a payment/credit provider, such as payment provider server 150, to associate merchant device 140 with a particular account maintained by the payment/credit provider. Database 146 may further include payment codes input by user 102 using communication device 110.

Merchant device 140 includes at least one communication module 148 adapted to communicate with communication device 110 and/or payment provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. In various embodiments, communication module 148 may communicate directly with communication device 110 and/or wireless beacon 130 using short range wireless communications, such as radio frequency, infrared, Bluetooth, and near field communications.

Payment provider server 150 may be maintained, for example, by an online payment service provider, which may provide payment services and/or processing for financial transactions on behalf of a user. In this regard, payment provider server 150 includes one or more processing applications which may be configured to interact with communication device 110, wireless beacon 130, and/or merchant device 140 to facilitate payment for a transaction. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to user 102 and/or merchant device 140.

Payment provider server 150 of FIG. 1 includes a check-in module 160, a payment code processing module 152, other applications 154, a database 156, and a network interface component 158. Check-in module 160, payment code processing module 152, and other applications 154 may correspond to executable processes, procedures, and/or applications with associated hardware. In other embodiments, payment provider server 150 may include additional or different software and/or hardware modules as required.

Check-in module 160 may correspond to one or more processes to execute modules and associated specialized hardware of payment provider server 150 to complete check-in with communication device 110 for a location corresponding to wireless beacon 130. In this regard, check-in module 160 may correspond to specialized hardware and/or software of payment provider server 150 configured to provide the server side process to receive a check-in request from communication device 110 and complete the check-in request. The check-in request may include log in information for a user account in database 156 and thus complete the check-in by verifying the account information. For example, the check-in information may include an identifier or other account information for a user/payment account of user 102 set up to provide payment for items. Additionally, the check-in information may include an account identifier for a receiving account of merchant device 140. However, in embodiments where one or more user accounts has not been previously established for user 102 and/or merchant device 140, check-in module 160 may receive other information for identifying user 102 and/or merchant device 140, include name/identifier, device identifier, an identifier for an account with another server (e.g., a payment account/payment account identifier with payment provider server 150), or other information.

Payment code processing module 152 may correspond to one or more processes to execute modules and associated specialized hardware of payment provider server 150 to receive and/or transmit information from communication device 110, wireless beacon 130, and/or merchant device 140 for processing and completion of financial transactions. In this regard, payment code processing module 152 may correspond to specialized hardware and/or software of payment provider server 150 to process financial transaction information between user 102 and merchant device 140 by receiving a payment code from merchant device 140. Prior to receiving the payment code, payment code processing module 152 may receive a request to generate the payment code wireless beacon 130. The request may correspond to a payment from user 102 to merchant device 140. The request may be for a general authorization amount, or may include a specific payment request for items selected for purchase by user 102. The payment may include a user account identifier or other payment information (e.g. a credit/debit card or checking account) for user 102 and a receiving account or payment information for merchant device 140. In other embodiments, the request may just identify a user account for user 102. Once the request is received, payment code processing module 152 may generate a payment code consistent with the request and transmit the payment code to wireless beacon 130. Payment code processing module 152 may complete the transaction by providing payment to merchant device 140 when payment provider server 130 received the payment code from merchant device 140. Additionally, payment code processing module 152 may provide transaction histories, including receipts, to communication device 110 and/or merchant device 140 for completion and documentation of the financial transaction. For example, a transaction history may be provided to communication device 110 and/or merchant device 140 to allow a party to view the transaction and provide the items and/or services to user 102.

In various embodiments, check-in module 160 and/or payment code processing module 152 may be incorporated in the same application so as to provide their respective features in one application.

In various embodiments, payment provider server 150 includes other applications 154 as may be desired in particular embodiments to provide features to payment provider server 150. For example, other applications 154 may include security applications for implementing server-side security features, programmatic server applications for interfacing with appropriate application programming interfaces (APIs) over network 170, or other types of applications. Other applications 154 may contain software programs, executable by a processor, including a graphical user interface (GUI), configured to provide an interface to a user.

Additionally, payment provider server 150 includes database 156. As previously discussed, user 102 and/or merchant device 140 may establish one or more user accounts with payment provider server 150. User accounts in database 156 may include merchant/user information, such as name, address, birthdate, payment/funding information, additional user financial information, and/or other desired user data. User 102 and/or merchant device 140 may link to their respective user accounts through a user, merchant, and/or device identifier. Thus, when an identifier is transmitted to payment provider server 150, e.g. from communication device 110 and/or merchant device 140, a user account belonging to mobile merchant 102 and/or user 104 may be found. In other embodiments, user 102 and/or merchant device 140 may not have previously established a user account and may provide other financial information to payment provider server 150 to complete financial transactions, as previously discussed.

In various embodiments, payment provider server 150 includes at least one network interface component 158 adapted to communicate communication device 110, wireless beacon 130, and/or merchant device 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
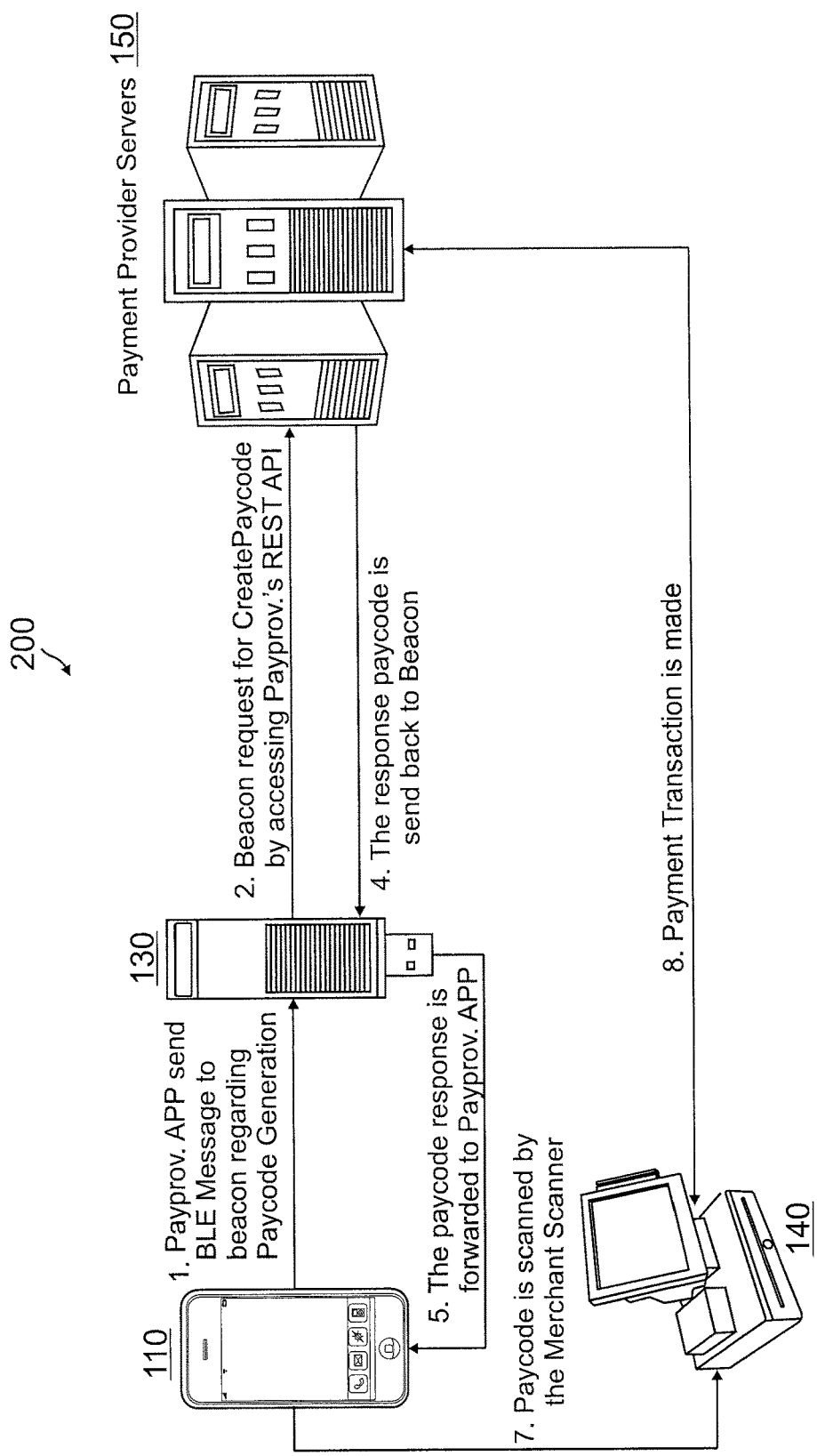
FIG. 2 is an exemplary diagram and flowchart illustrating generation of a payment code using a wireless beacon, according to an embodiment.

FIG. 2 is an exemplary diagram and flowchart illustrating generation of a payment code using a wireless beacon, according to an embodiment. FIG. 2 shows communication device 110 executing a payment module that operates in conjunction with wireless beacon 130 and payment provider server 150. Communication device 110 may form a connection with wireless beacon 130 using short range wireless communications, such as BLE communications. Once a connection is formed between communication device 110 and wireless beacon 130, communication device 110 may pass information to wireless beacon 130, which may be used to generate check-in information for communication device 110 and/or the user of communication device 110 with the location for wireless beacon 130 (e.g., a merchant location associated with merchant device 140). After communication device 110 is checked in to the beacon, at 1, communication device 110 sends a BLE message to wireless beacon 130 requesting payment provider server 150 generate a payment code for user with merchant device 140.

Thus, at 2, wireless beacon 130 receives the request and then requests that payment provider server 150 generate a payment code by accessing an API of a payment code processing module of payment provider server 150. For example, the payment code processing module may correspond to one or more processes of payment provider server 150 to access check-in information used to identify a payment account of the user and receive the request to generate the payment code. Payment provider server 150 then generates the code at 3, which may be generated using the payment account. However, in other embodiments, the check-in information may be used to verify the identity of the user (e.g., through an identifier) and the request may include a financial account, payment card, gift card, etc., that should be used to generated the payment code. At 4, payment provider server 150 communicates the payment code to wireless beacon 130, such as over a network connection. Wireless beacon 130 uses the connection with communication device 110 to forward the payment code to communication device 110, at 5, and in various embodiments, additional information such as an account balance to communication device 110.

The communication device renders the payment code at 6 to the user, which may include an alphanumeric, bar, or QR code. The payment code may also be displayed with additional information, such as the account balance, as well as an amount that the payment code is valid for. In various embodiments, the additional information may further include valid purchases that the payment code may be used with or other relevant information (e.g., time of expiration of the payment code, location of use for the payment code, or other validity information). At 7, a merchant scans or otherwise captures the payment code rendered on communication device 110 using merchant device 140 where the payment code displays a visible or readable code. However, in other embodiments, communication device 110 may communicate a message include data for the payment code to merchant device 110, for example, using short range wireless communications. The payment code then enables a transaction to occur between merchant device 110 and payment provider server 150, such as payment for a purchase/transaction between the user and the merchant. The transaction may be a purchase of an item or service from the merchant, which is paid for using the payment code. The merchant may capture the payment code in other ways, such as manual entry by a sales associate or the user, voice entry, etc.

Figure 3:
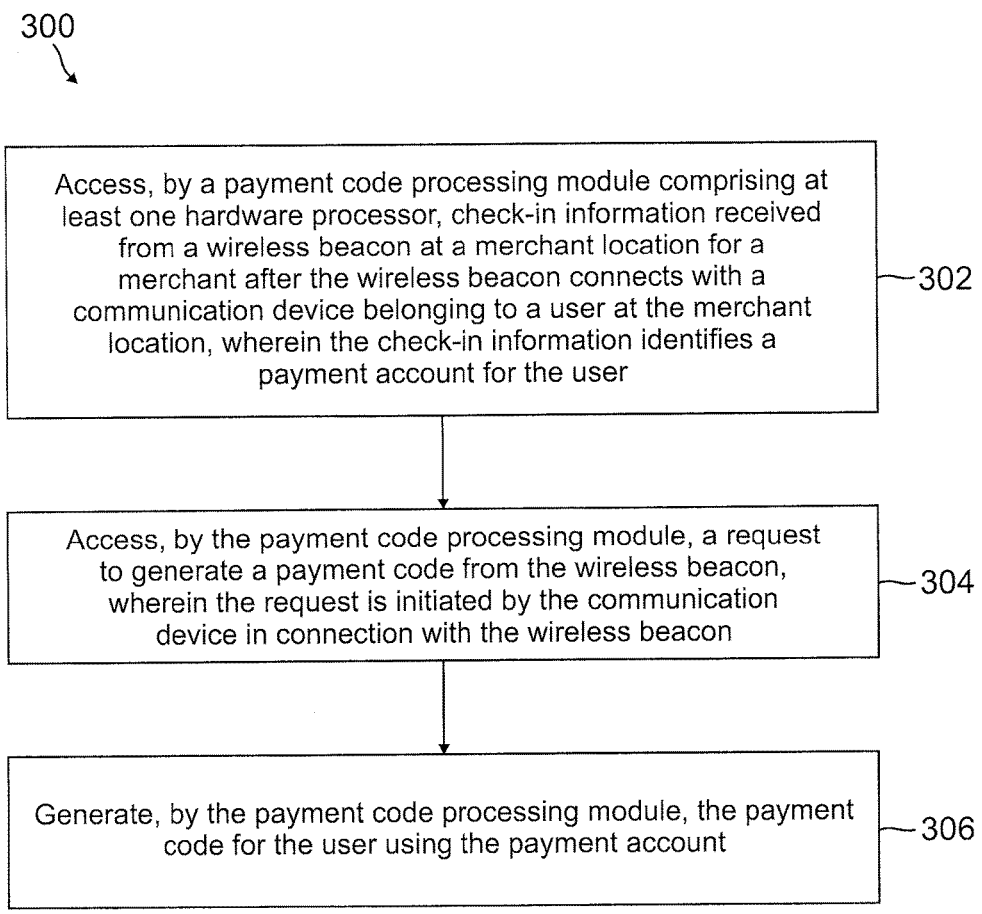
FIG. 3 is a flowchart of an exemplary process by for generating a payment code received from a wireless beacon connected to a communication device at a merchant, according to an embodiment.

FIG. 3 is a flowchart of an exemplary process by for generating a payment code received from a wireless beacon connected to a communication device at a merchant, according to an embodiment. Note that one or more steps, processes, and methods described herein may be omitted, performed in a different sequence, or combined as desired or appropriate.

At step 302, check-in information received from a wireless beacon at a merchant location for a merchant generated when the wireless beacon connects with a communication device belonging to a user at the merchant location is accessed, by a payment code processing module comprising at least one hardware processor, wherein the check-in information identifies a payment account for the user. The wireless beacon may connect with the communication device using one of near field communication, radio communication, infrared communication, Bluetooth communication, and Bluetooth low energy communication. The check-in information may comprise an identifier for one of the user and the communication device. Thus, the payment code processing module may further identify the payment account of the user using the identifier.

At step 304, a request to generate a payment code is received from the wireless beacon, by a network interface component, wherein the request is initiated by the communication device in connection with the wireless beacon. The request may be initiated by the user, such as through a payment application of the communication device. For example, the user may enter in a request amount (e.g., a total from a bill or transaction with the merchant) or generally request an amount or a credit extension (e.g., $100 from an account or of credit while shopping at the merchant). In other embodiments, the request may be initiated when the user enter the merchant location or as the user approaches a merchant checkout counter at the merchant location. Thus, the request may be for a general amount in such embodiments (e.g., $100 from an account or of credit for use at the merchant location). Moreover, the request may also be initiated by the merchant with the user when the user is ready to checkout and pay for a transaction or bill. The user may therefore initiate a transaction with the merchant, for example, by bringing items to the checkout counter and having the merchant enter them into a transaction, where the transaction total is included in the request to the payment provider so that the payment provider may generate a payment code for the specific transaction, which may be associated with the payment amount. At step 306, the payment code is generated for the user using the payment account. The payment code may be communicated to the wireless beacon for transmission to the communication device by the wireless beacon. In various embodiments, the payment code may be generated and transmitted to the communication device automatically on connection with the wireless beacon by the communication device. The payment code may then be communicated back to the payment provider by the merchant device, where the payment provider and the merchant resolve payment for the transaction, bill, or other payment request by the user, for example, by debiting an account of the user and crediting an account of the merchant.

The check-in information may comprise at least one of a user financial account, a user payment card, and user financial information. Thus, the payment code may be generated using the at least one of the user financial account, the user payment card, and the user financial information instead of the payment account, where the payment account may be used to track the payment code and transaction histories, log a history of the payment code and transaction histories, and/or verify the identity of the user and/or whether the user is entitled to use the information in the check-in information. Moreover, the request may comprise a payment request having an amount to be paid to the merchant, and wherein the payment code is generated using the payment request.

The payment code processing module may further determine a transaction limit for the user using the payment account, wherein the payment code is further generated using the transaction limit. In other embodiments, the payment code processing module may further determine a preapproved credit limit for the user using the check-in information, wherein the payment code is generated using the preapproved credit limit. The payment code may expire after a period of time or be configured to expire on the communication device when the communication device disconnects from the wireless beacon. The payment code may comprise one of an alphanumeric code, a bar code, and a QR code, wherein the communication device displays the payment code for input to a merchant device for the merchant at the merchant location, and wherein the merchant utilizes the payment code to receive the payment from the payment account of the user. A message may include the payment code, wherein the communication device transmits the message to a merchant device for the merchant and the merchant location using a connection with the merchant device, and wherein the merchant utilizes the payment code to receive the payment from the payment account of the user.

Figure 4:
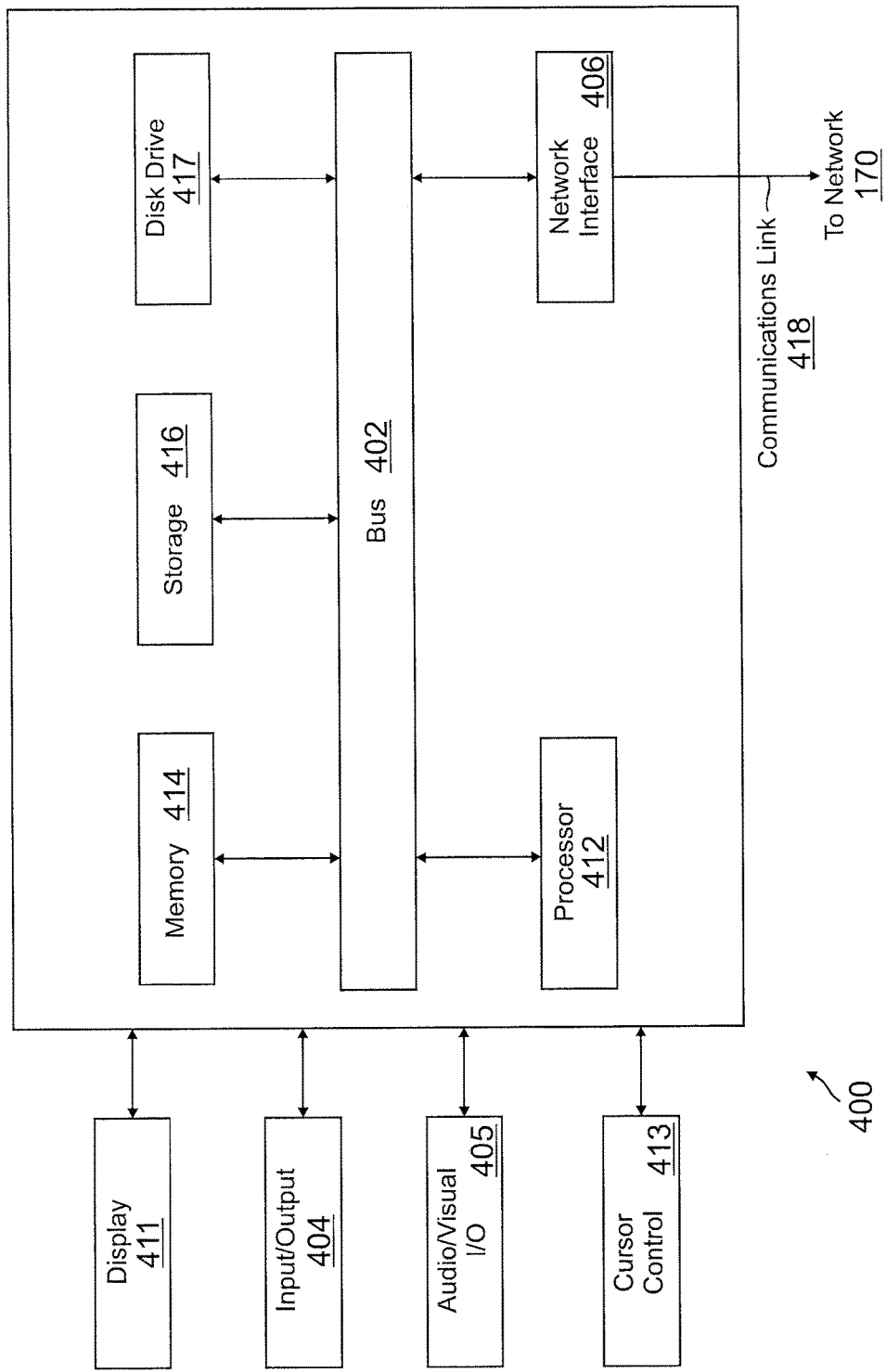
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the communication device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another communication device, a merchant device, or a service provider server via network 170. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   detecting a passive check-in request for a communication device, the passive check-in request initiated as a result of a first wireless exchange between the communication device and a wireless beacon installed at a merchant location associated with a merchant while the communication device is within a predetermined distance of the wireless beacon and without requiring affirmative action by a user on the communication device, the passive check-in request comprising identifying a payment account of the user with a service provider;
   establishing a wireless connection between the communication device and the wireless beacon based on the passive check-in request;
   receiving, via the wireless beacon and the wireless connection, a request to generate a payment code from the communication device, wherein the request is initiated by the communication device in connection with the wireless beacon and comprises an amount transmitted from a merchant device connected to the wireless beacon and confirmed for generation of the payment code by the communication device;
   generating the payment code for the user based on the payment account, wherein the payment code comprises a tokenized code for output to the merchant device to effectuate a payment;
   communicating, via the wireless beacon and the wireless connection, the payment code to the communication device; and
   in response to receiving the payment code from the merchant device, automatically processing a payment transaction for the amount using the payment account.

2. The system of claim 1, wherein the wireless beacon automatically connects with the communication device when the communication device is within the predetermined distance from the wireless beacon using one of a near field communication, a radio communication, an infrared communication, a Bluetooth communication, or a Bluetooth low energy communication.

3. The system of claim 1, wherein the account identifier comprises an identifier associated with one of the user or the communication device.

4. The system of claim 1, wherein the operations further comprise:
   determining the payment account of the user using the account identifier.

5. The system of claim 1, wherein the operations further comprise:
   determining a transaction limit for the user based on the payment account and the amount, wherein the payment code is generated further based on the transaction limit.

6. The system of claim 1, wherein the payment account comprises at least one of a user financial account, a user payment card, or user financial information.

7. The system of claim 6, wherein the payment code is generated using the at least one of the user financial account, the user payment card, or the user financial information.

8. The system of claim 1, wherein the operations further comprise:
   determining a preapproved credit limit for the user based on the payment account and the amount, wherein the payment code is generated further based on the preapproved credit limit.

9. The system of claim 1, wherein the operations further comprise deactivating the payment code in response to determining that a period of time has passed after communicating the payment code to the communication device.

10. The system of claim 1, wherein the operations further comprise deactivating the payment code in response to detecting the communication device is disconnected from the wireless beacon.

11. The system of claim 1, wherein the payment code is generated further based on a merchant identifier of the merchant.

12. The system of claim 1, wherein the payment code comprises one of an alphanumeric code, a bar code, or a QR code, and wherein the operations further comprise causing the communication device to transmit the payment code to the merchant device.

13. A method comprising:
  detecting, by one or more hardware processors, a passive check-in request for a communication device, the passive check-in request initiated as a result of a first wireless exchange between the communication device and a wireless beacon installed at a merchant location associated with a merchant while the communication device is within a predetermined distance of the wireless beacon and without requiring affirmative action by a user on the communication device, the passive check-in request comprising an account identifier identifying a payment account of the user with a service provider;
  establishing, by the one or more hardware processors, a wireless connection between the communication device and the wireless beacon;
  receiving, by the one or more hardware processors via the wireless beacon and the wireless connection, a request to generate a payment code from the communication device, wherein the request is initiated by the communication device in connection with the wireless beacon and comprises an amount transmitted from a merchant device connected to the wireless beacon and confirmed for generation of the payment code by the communication device;
  generating, by the one or more hardware processors, the payment code for the user based on the payment account, wherein the payment code comprises a tokenized code for output to the merchant device to effectuate a payment;
  communicating, by the one or more hardware processors via the wireless beacon and the wireless connection, the payment code to the communication device; and
  in response to receiving the payment code from the merchant device, automatically processing, by the one or more hardware processors, a payment transaction for the amount using the payment account.

14. The method of claim 13, further comprising:
  determining a transaction limit for the user based on the payment account and the amount, wherein the payment code is generated further based on the transaction limit.

15. The method of claim 13, further comprising determining a preapproved credit limit for the user based on the payment account and the amount, wherein the payment code is generated further based on the preapproved credit limit.

16. The method of claim 13, wherein the payment code is generated further based on a merchant identifier of the merchant.

17. A non-transitory machine-readable medium having stored thereon machine-readable instructions executable to cause a machine to perform operations comprising:
  detecting a passive check-in request for a communication device, the passive check-in request initiated as a result of a first wireless exchange between the communication device and a wireless beacon installed at a merchant location associated with a merchant while the communication device is within a predetermined distance of the wireless beacon and without requiring affirmative action by a user on the communication device, the passive check-in request comprising an account identifier identifying a payment account of the user with a service provider;
  establishing a wireless connection between the communication device and the wireless beacon based on the passive check-in request;
  receiving, via the wireless beacon and the wireless connection, a request to generate a payment code from the communication device, wherein the request is initiated by the communication device in connection with the wireless beacon and comprises an amount transmitted from a merchant device connected to the wireless beacon and confirmed for generation of the payment code by the communication device;
  generating the payment code for the user using the payment account, wherein the payment code comprises a tokenized code for output to the merchant device to effectuate a payment;
  communicating, via the wireless beacon and the wireless connection, the payment code to the wireless beacon for transmission to the communication device; and
  in response to receiving the payment code from the merchant device, automatically processing a payment transaction for the amount using the payment account.

18. The method of claim 13, further comprising causing the communication device to transmit the request to generate the payment code in response to the communication device receiving the amount from the merchant device.

19. The method of claim 13, further comprising invalidating the payment code in response to detecting the communication device is disconnected from the wireless beacon.

20. The method of claim 13, further comprising invalidating the payment code in response to determining a predetermined period of time has passed after communicating the payment code to the communication device.

* * * * *

UNITED STATES PATENT AND TRADEMARK OFFICE
CERTIFICATE OF CORRECTION

PATENT NO. : 10,127,542 B2
APPLICATION NO. : 14/697926
DATED : November 13, 2018
INVENTOR(S) : Mobeen Syed Page 1 of 1

It is certified that error appears in the above-identified patent and that said Letters Patent is hereby corrected as shown below:

In the Claims

In Column 17, Line 66, change "comprising identifying a payment" to --comprising an account identifier identifying a payment--

In Column 20, Line 31-32, change "payment code to the wireless beacon for transmission to the communication device" to --payment code to the communication device--

Signed and Sealed this
Ninth Day of July, 2019

Andrei Iancu
*Director of the United States Patent and Trademark Office*